United States Patent [19]

Ritter

[11] Patent Number: 4,957,698
[45] Date of Patent: Sep. 18, 1990

[54] ADVANCED BOILING WATER REACTOR FUEL ASSEMBLY DESIGN

[75] Inventor: Gerald L. Ritter, Richland, Wash.

[73] Assignee: Advanced Nuclear Fuels Corporation, Bellevue, Wash.

[21] Appl. No.: 312,553

[22] Filed: Feb. 17, 1989

[51] Int. Cl.⁵ .............................................. G21C 3/32
[52] U.S. Cl. ...................................... 376/444; 376/435
[58] Field of Search ................................. 376/444, 435

[56] References Cited

U.S. PATENT DOCUMENTS

| | | | |
|---|---|---|---|
| 4,675,154 | 6/1987 | Nelson et al. | 376/444 |
| 4,708,846 | 11/1987 | Patterson | 376/444 |
| 4,749,547 | 6/1988 | Blomstrand | 376/444 |
| 4,777,016 | 10/1988 | Yoshioka | 376/444 |
| 4,781,885 | 11/1988 | Lill | 376/444 |

FOREIGN PATENT DOCUMENTS 3824082 1/1989 Fed. Rep. of Germany ...... 376/444
52-50498 4/1977 Japan ................................... 376/444

OTHER PUBLICATIONS

Copy of 'L' Supplied by Applicant w/translation.

*Primary Examiner*—Donald P. Walsh
*Attorney, Agent, or Firm*—Volker R. Ulbrich; Lawrence C. Edelman

[57] ABSTRACT

An advanced boiling water reactor (BWR) fuel design is described that preferentially directs more unvoided water coolant into the upper portion of the fuel assembly. This allows relatively more fuel to be placed in the lower portion of the fuel assembly. This arrangement allows a more nearly optimun moderation of neutrons in the upper portion of the assembly while preserving a higher volume of fuel in the lower portion. In addition to providing a more nearly optimum distribution of water in the assembly, the larger number of fuel rods can be used in the lower portion to reduce the linear heat generation rate (power peaking) in the assembly.

3 Claims, 1 Drawing Sheet

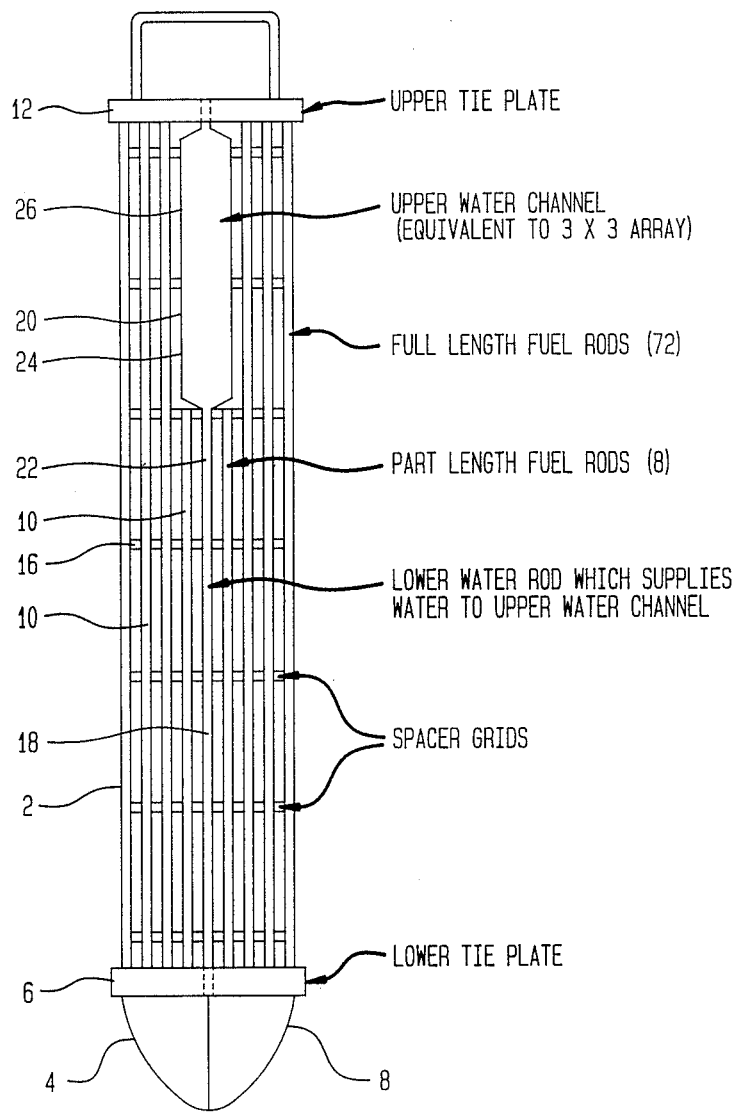

ADVANCED BOILING WATER REACTOR FUEL ASSEMBLY DESIGN

BACKGROUND

The steam volume fraction in the water coolant of a BWR increases with height in the reactor core due to the generation of steam along the length of the fuel rods in the boiling process. Thus, at the bottom of a BWR fuel assembly, there is essentially 100 percent unvoided water surrounding the fuel rods, but the percentage of unvoided water decreases up to the top of the fuel assembly. Near the bottom of the assembly, sufficient water exists to provide effective neutron moderation. However, due to the presence of steam in the upper part of the assembly, the assembly is under-moderated. The addition of water rods or water channels to the fuel assembly provides the water in the upper portion of the assembly that is needed to improve neutron moderation and hence uranium utilization efficiency.

BWR fuel designs typically have a varying number of fuel rods and water rods (or channels) in square arrays, such as $7 \times 7$, $8 \times 8$, $9 \times 9$, $10 \times 10$, or $11 \times 11$. The fuel rods and water rods (or channels) in the arrays are held in place by spacer grids distributed along the length and by tie plates at each end of the assembly. The fuel rods and water rods extend through the full length of the fuel assembly, i.e. the cross section of the active fuel zone is uniform over the full length of the assembly.

Early BWR fuel designs usually employed one or two water rods near the center of the fuel assembly which displaced one or two fuel rods. The purpose of the water rods was to put more water into the center of the assembly to improve neutron moderation and uranium utilization in the surrounding fuel rods.

More recent designs have employed an even greater number of water rods or large water channels. For example, Advanced Nuclear Fuels Corporation of Richland, Wash., U.S.A. has fabricated a $9 \times 9$-5 design which includes 76 fuel rods and 5 water rods. Also, lead assemblies of a $9 \times 9$-IX design have been sold which includes 72 fuel rods and an internal water channel that displaces 9 fuel rods.

While these designs improve the water moderation and uranium utilization in the fuel assembly, replacement of the fuel rods with water rods requires the linear heat generation rate (LHGR) to increase in the remaining fuel rods in order to produce equivalent energy in the entire assembly. Thus, the peak LHGRs increases as fuel rods are replaced with water rods. This can increase the probability of fuel rod failures during reactor power maneuvers due to pellet clad interaction (PCI). Also, the higher LHGRs reduce the margin to reactor operating or Technical Specification limits.

BRIEF DESCRIPTION OF THE INVENTION

An advanced BWR fuel assembly design has been conceived that more optimally locates unvoided water and fuel in the assembly along the length of the assembly. A single water rod or small cross section water channel is located in the lower one-half to two-thirds of the assembly which provides water to an enlarged water rod or channel in the upper one-half to one-third of the assembly. The enlarged water rod or channel can displace as many fuel rods in the upper portion as is needed to achieve near optimum neutron moderation while achieving other fuel performance objectives. Part length fuel rods are used in the lower portion of the assembly below the enlarged water rod or channel. This design increases the unvoided water volume in the upper part of the assembly where it is needed while maintaining a large number of fuel rods in the lower part of the assembly. Thus, lower linear heat generation rates can be achieved in the fuel assembly.

For example, a $9 \times 9$ fuel design with an internal water channel that displaces 9 fuel rods along its full length would have an LHGR that is about 7 percent higher than a design using this invention that includes 80 fuel rods in the lower two-thirds of the assembly and 72 fuel rods (with a water channel displacing 9 fuel rods) in the upper one-third of the assembly. The uranium utilization in both fuel assemblies can be adjusted to be about the same by varying the relative length of the water channel and part length fuel rods. Similarly, a $10 \times 10$ fuel design with an internal water channel replacing 12 fuel rods would have an LHGR that is about 8 percent higher than a design using this invention that includes 99 fuel rods in the lower two-thirds of the assembly and 88 fuel rods (with a water channel displacing 12 fuel rods) in the upper one-third of the assembly.

Calculations indicate that this design will result in considerably lowered fuel cycle costs as compared to assemblies having internal water channels of uniform cross sections.

BRIEF DESCRIPTION OF THE DRAWING

The single FIGURE illustrates the new BWR fuel design for an exemplary $9 \times 9$ array.

DETAILED DESCRIPTION

The general structure of the boiling water assembly involved in this description is the same as that of U.S. Pat. No. 4,708,846 which is specifically incorporated herein by reference.

The assembly includes an outer flow channel 2, and inlet nozzle 4 which supports a lower tie plate 6, and has at its lower end an opening 8 for the reception of cooling water. As in the structure shown in the patent, there are also a number of full-length fuel rods 10 which are supported at their lower ends on lower tie plate 6 and which extend at their upper ends into a upper tie plate 12. The fuel rods are held spaced from one another by grid spacers 16.

All the parts described thus far have the same form as shown in the above referenced patent. That patent also includes a central water rod 18. Our system includes such a water rod, aslo designated 18, but it has a different form than that shown in the patent. In the patented structure the water rod is of essentially the same diamter throughout its length, although it may be tapered slightly where it penetrates the lower tie plate 6 to receive a flow of cooling water. In our system, the water rod, better termed a water channel in this case, has an increased volume and cross-section in its upper portion as indicated at 20. In the specific design shown, the fuel rods 10 are arranged in a $9 \times 9$ array, but the enlarged portion 20, about the upper 50 percent of the water channel, is square and occupies an equivalent of $3 \times 3$ array of fuel rods. There are therefore only 72 full-length fuel rods rather than the 81 which would occupy a conventional assembly of this arangement. Below the enlarged portion 20, there are 8 part-length rods 10'. In the simplest arrangement, as shown in this figure, water enters the lower end of tube 18 and lfows upwardly into the enlarted portion 20. At the same time, the main body of cooling water is flowing upwardly between the rods 10, 10'. As it progresses up the assembly, more and more is converted into steam. The water in tube 18 and enlarged portion 20, however, does not contact the fuel rods and, therefore, does not boil. As a result of the greater cross section of liquid water, there is greater moderating capacity in the upper part of the water channel. There the concentration of hydrogen is lower in the cooling fluid which consists of a large proportion of steam at this point. The water in channel 18, 20 flows out the upper end.

As explained in the above-cited patent, there may be a shortage of cooling capacity in the upper porrtion of the assembly due to the poor heat cooling capacity in the upper portion of the assembly due to the poor heat exchange between the fuel and steam. It may therefore be desirable to provide openings 22, 24, 26 in the fuel channel to cause injection of cooling water among the fuel rods in this portion of the assembly. The expanding cross-section of the channel 18, 20 also serves to deflect water from its relatively cool walls outwardly among the fuel rods.

Various modifications of the arrangement shown are possible. For example, instead of the "straight through" flow of water indicated in the drawing, it may be desirable to use the "reverse flow" shown in the above patent. That is, the tube 18 might be extended to the top of the large portion 20 and the top of the latter closed. The water would then flow upwardly through the lengthened tube 18 to the top of enlarged portion 20, out and downwardly through the latter, finally exiting at openings 24 and 26. The channel may also have different forms than shown. For example, instead of unitary enlargement 20 the tube 18 may be provided with branches at its top which would essentially occupy the spaces that would be filled by the rods 10' if they were extended. Moreover, instead of being round or square, the channel may be of the "water cross" type as shown for example in U.S. Pat. No. 4,749,547. When of this form, it may also include the "reverse flow" of U.S. Pat. No. 4,708,846 as disclosed in U.S. Patent Application Ser. No. 116,606 filed Nov. 3, 1987 by John F. Patterson and assigned to the assignee of this application.

The channel 18, 20 may, if desired, be positioned asymmetrically in the assembly to compensate for the difference in moderation at the periphery of the channel 2 because of the differing widths of the water gaps on the sides which receive the control rods and those which do not.

Still further, more than one channel may be provided if desirable. Various other variations may also occur to those skilled in the art. I therefore wish my invention to be limited solely by the scope of the following claims.

I claim:

1. A fuel assembly for a boiling water nuclear reactor comprising;
   an outer flow channel;
   a plurality of fuel rods within said outer flow channel and parallel thereto, some of said fuel rods extending the full length of said outer flow channel;
   an inner flow channel positioned among said fuel rods and generally parallel thereto, said inner flow channel being so constructed and arranged as to admit water at its lower end and to permit water to flow substantially the entire length thereof, said inner flow channel comprising a lower portion having a substantially uniform cross section and an upper portion having a substantially uniform cross section substantially greater than that of said lower portion;
   said upper portion comprising a plurality of branches connected to the upper end of said lower portion;
   and a plurality of partial-length fuel rods adjacent to said lower portion of said inner flow channel and extending substantially from the bottom of said assembly to the lower end of said upper portion of said inner flow channel.

2. A fuel assembly as defined in claim 1, wherein said partial length rods are substantially in line with said branches.

3. A fuel assembly as defined in claim 1, wherein said inner flow channel is provided with openings for the ejection of water among said fuel rods.

* * * * *